Patented Mar. 28, 1950

2,502,119

UNITED STATES PATENT OFFICE 2,502,119

ELECTRIC CONTROL SYSTEM

Charles F. Bauersfeld, Schenectady, and Martin Arthur Edwards, Scotia, N. Y., assignors to General Electric Company, a corporation of New York Application December 30, 1947, Serial No. 794,546

8 Claims. (Cl. 318—93)

Our invention relates to an electric control system for dynamoelectric machines and more particularly to automatic control for electric traction motors.

During operation of traction motors, it is often necessary to change the motor connections according to the speed reached by the vehicle. It is advanageous to have such transitions caused automatically rather than by manual operation and, in the past, centrifugal governors and electrical tachometer generators have been used to effect the transition. Centrifugal governors have the disadvantage of being complicated and subject to mechanical failure. Heretofore, tachometer generators have had certain limitations due to the usual small rate of rise of the controlling medium (voltage, current or frequency) with respect to vehicle speed change.

It is an object of the present invention to provide speed responsive apparatus having a response characterized by a rapid rate of rise.

Another object of the present invention is to provide a relay system having an accurate but small band between pick-up and drop-out of each of several sensitive relays arranged to operate over different non-linear response characteristics which are each steep at (and between) the respective points of pick-up and drop-out.

A further object of the present invention is to provide, for use on a locomotive, a frequency responsive controller which affords automatic motor field shunting, motor transfer, warning, and overspeed protection.

A still further object of the present invention is to provide a sensitive relay system which is essentially rugged and unaffected by vibration, shock and rough handling.

Broadly the means employed in the embodiment herein illustrated and described comprise a plurality of frequency responsive controllers having their inputs obtained from a tachometer generator coupled to an axle of a driven vehicle such as a Diesel-electric locomotive. Each controller uses a non-linear resonance circuit and filter network comprising one or more reactors and one or more capacitors to resonate the input signal to a large value to operate a sensitive relay and also to provide a sharp rise in voltage for a small change of tachometer speed within the desired frequency range. Special provision is also made to bring the drop-out value of each relay somewhere near to the pick-up value.

Figure 1:
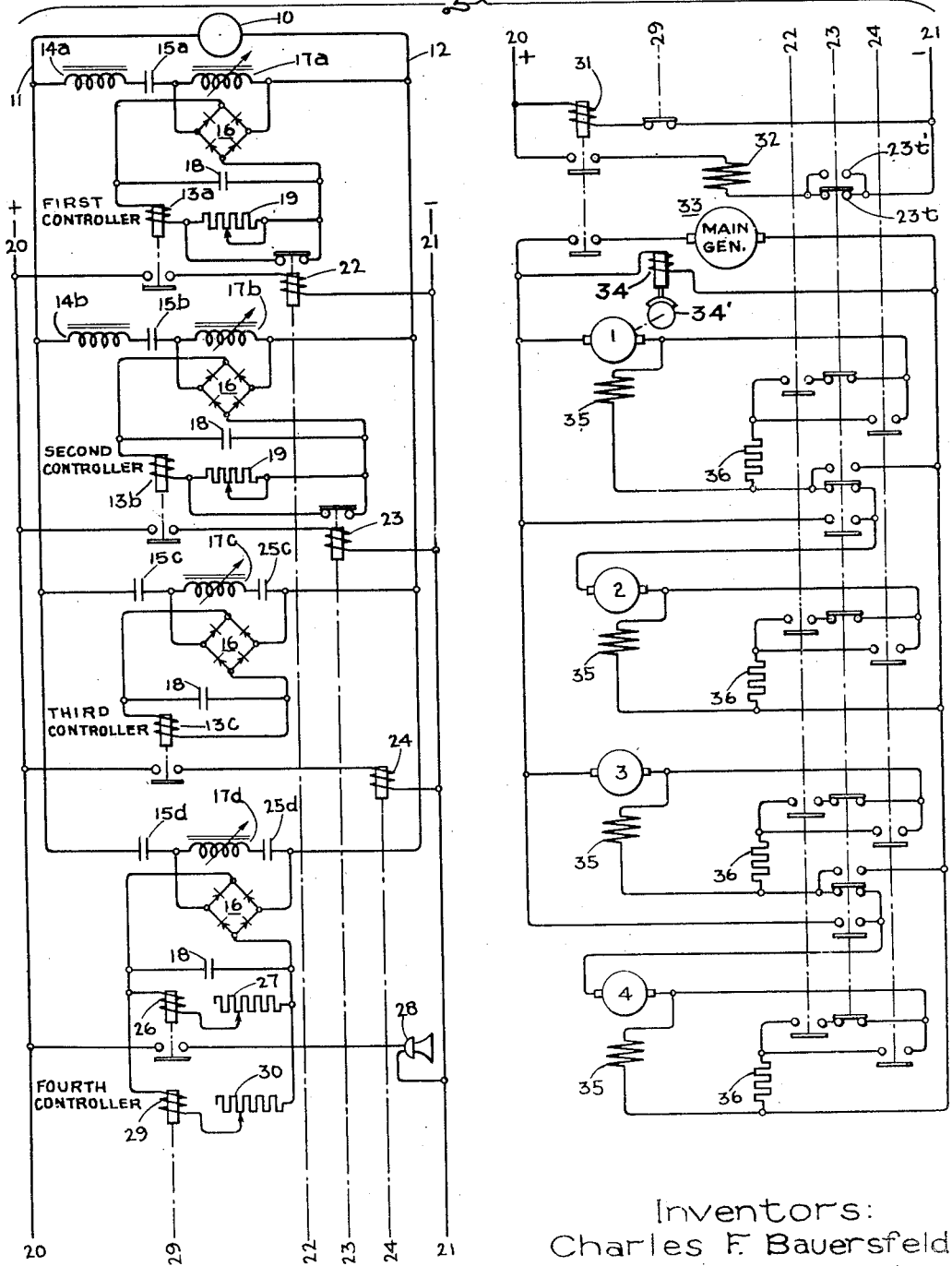
Figure 2:
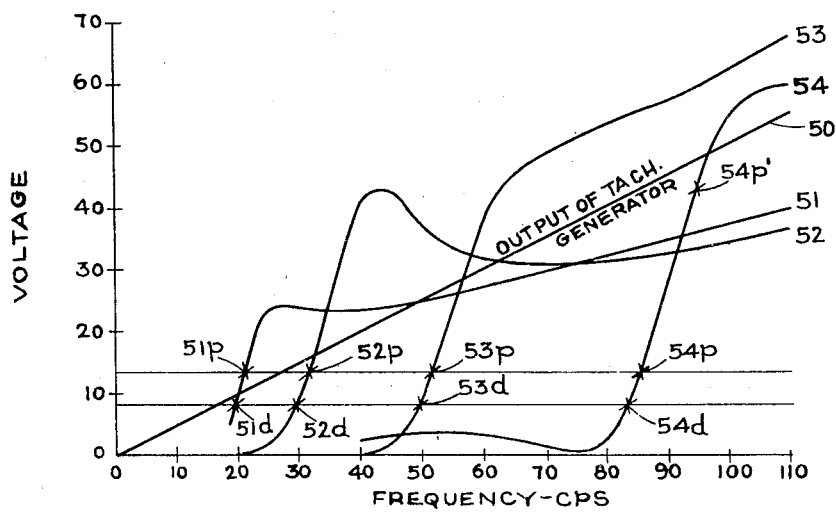
Figure 3:
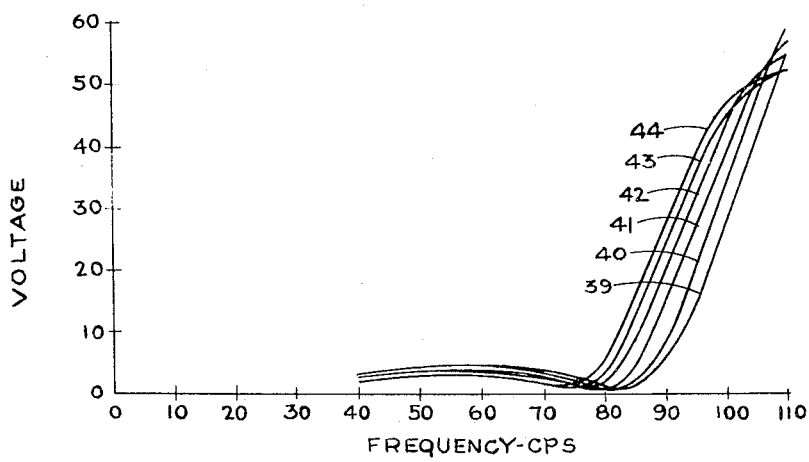

Further objects and advantages will become apparent and my invention will be better understood from consideration of the following description taken in connection with the accompanying drawing in which Fig. 1 represents a schematic diagram of an electrical system embodying a tachometer generator supplying frequency responsive controllers for the control of four vehicle drive motors and other apparatus; Fig. 2 is a series of characteristic curves showing how the voltage applied to each of the initial or sensitive relays of Fig. 1 is affected by the frequency of the output of the axle tachometer generator; and Fig. 3 represents a series of curves showing how the output characteristic of a single relay is altered to correct for variations in diameter of vehicle wheels.

Referring now to Fig. 1, in which I have shown a schematic diagram of the entire control scheme, 10 represents a tachometer generator driven by an axle (not shown) of a Diesel-electric locomotive. Preferably, the tachometer generator has a rotating permanent magnet field and the output is taken from the stator windings so that the use of brushes is rendered unnecessary. Such a tachometer generator has an alternating voltage output which varies in amplitude and also in frequency in accordance with the locomotive speed. Through the connections 11 and 12 this signal is used to feed four controller circuits. Each controller circuit includes a sensitive relay, such as 13a, of the direct current type. In order to sharpen the signal supplied at the various critical frequencies to the relays such as 13a, the signal is for each relay passed through a different non-linear resonance circuit and filter network comprising a capacitor such as 15a and a variable reactor such as 17a. The variable reactor 17a is preferably provided with a closed core. If desired an additional reactor such as 14a shown in the first controller circuit or a capacitor such as 25c shown in the third controller circuit may be added in the network. The reactor 14a may be either a closed or open core reactor depending on the characteristics desired of the non-linear resonance circuit. For each of the four controller circuits the signal is taken from the respective filter to the input of a full wave rectifier 16 which may be conveniently be of the selenium type. The output of the rectifier is filtered by means of a capacitor 18 and fed to the coil of sensitive relay such as 13a. An adjustable resistor 19 may be used to control the drop-out value of the relay as hereinafter more fully explained.

A separate source of power, such as a battery, is used to provide a direct current potential to the wires 20 and 21 which, through a contact on each of the sensitive relays, energize the coil of a control relay such as 22 when the associated sensitive relay is energized. A normally closed contact on control relay 22 shorts out adjustable resistor 19 so that this rheostat affects only the drop-out point for the sensitive relay 13a and does not affect the point at which the relay picks up. The second control section is substantially the same as the first and similar parts in general are like numbered. The value of capacitor 15b may be different than that of the corresponding capacitor 15a or variable reactor 17b may have a different value than variable reactor 17a, etc. Main control relays such as 22 and 23 may be like parts but have been given different numbers to facilitate tracing their respective contacts.

The diagram for the circuit of the third controller is substantially the same as that previously described in connection with the first controller, but it will be seen that the third tuned circuit does not have an additional series reactor like 14a in the first controller but adds an additional capacitor 25c in series with the variable reactor 17c to parallel the input of the rectifier. In addition, this circuit does not have the drop-out tuning feature provided by rheostat 19 in the first two controllers. However, the circuit of the third controller operates in a manner similar to that hereinabove described to energize the coil of a control relay, 24.

In a similar manner, the input to the fourth rectifier 16 is passed through a filter circuit comprising a capacitor 15d and a variable reactor 17d and capacitor 25d, while the output from the rectifier is filtered by a capacitor 18. However, the fourth controller has two sensitive relays. One of these relays 26, the coil of which has a series variable resistor 27, is used to energize a circuit to sound an alarm horn 28. The other relay 29, the coil of which is provided with a series variable resistor 30, is used to energize a control relay 31 to remove the field 32 from a main generator 33 which is assumed being driven at substantially constant speed by a Diesel machine. Relay 31 also opens the armature circuit of the generator and applies brakes to the vehicle by deenergization of brake release solenoids such as 34.

With normal operation the Diesel engine is driving the rotatable member of main generator 33 at substantially constant speed. Sensitive relay 29 is deenergized at all conditions, except extreme overspeed, so that normally contactor 31 is energized and a supply of power is furnished for main driving motors 1, 2, 3, and 4 and any associated apparatus, such as brake release solenoid 34. With the brake release solenoid energized the brakes such as that shown in schematic form at 34' are released.

Each of the main driving motors 1, 2, 3, and 4 is provided with a conventional commutated armature and a series field 35. Each series field is provided with a shunting resistor 36 to allow high speed operation with weakened field. The circuit to the armature, series field, and shunting resistor for each motor is interlocked with contacts of the control relays 22, 23, and 24 in the manner shown in Fig. 1 to provide the following conditions of operation:

1. With none of the sensitive relays energized—the motors operate with motor 1 and 2 in series and together in parallel with motors 3 and 4 which are also in series across the line with all the series field shunting resistors inoperative;

2. With the sensitive relay 13a energized and consequently control relay 22 energized—the motors operate with motor 1 and 2 in series and together in parallel with motors 3 and 4 which are also in series across the line with the series field shunting resistors acting to weaken the field on each of the motors;

3. With the sensitive relay 13b energized and consequently control relay 23 energized—all of the motors operate in parallel across the line with all the series field shunting resistors inoperative;

4. With the sensitive relay 13c energized and consequently control relay 24 energized—all of the motors operate in parallel across the line with the series fields shunted to weaken the field for highest speed operation of each motor;

5. With sensitive relay 26 energized the alarm horn 28 will sound a warning that the locomotive has reached a speed of, say, five miles per hour below the maximum at which sensitive relay 29 will operate to remove the field of the main generator, to interrupt the main generator armature circuit removing power from all drive motors, and to deenergize the brake release solenoid 34 to apply the brakes and stop the vehicle.

It will be seen from Fig. 1 that control relay 23 has contacts acting as an interlock in the circuit of generator field 32 to remove voltage from the drive motors at the instant of transition from series to parallel operation. There is a normally closed contact 23t which is closed when relay 23 is deenergized and a normally open contact 23t' which operates after a time delay to reenergize the field after first keeping it deenergized for the short time required to effect the transition. For the reverse action, 23t' opens instantaneously and 23t requires a time delay to close so that the field is deenergized for the short time required to transfer back to series operation of the motors.

Actually, of course, control relays such as 22, 23 and 24 may only control the action of larger contactors rather than themselves control the large currents of the power circuits as has been shown in Fig. 1 for the purpose of simplification.

Referring now to Fig. 2, I have shown a family of curves representing voltage plotted against frequency. The straight line 50 represents the A. C. output voltage of the tachometer generator which, of course, has zero frequency and zero voltage when the vehicle is stationary and which has an output of increased voltage and frequency as the vehicle proceeds at correspondingly greater rates of speed. Curve 51 represents a D. C. voltage characteristic across the input of the first sensitive relay, 13a, as determined by the non-resonant circuit comprising reactor 14a, capacitor 15a, and adjustable reactor 17a at one of its settings. On this curve, point 51p is the point at which sensitive relay 13a will pick up with increasing frequencies and point 51d is the point at which the relay will drop out with decreasing frequencies, that is for a certain adjustment of drop-out resistor 19. Curve 52 represents the input of the second sensitive relay, 13b, as determined by the second non-linear resonant circuit comprising reactor 14b, capacitor 15b and adjustable reactor 17b at one of its settings. On this curve point 52p is the point at which sensitive relay 13b will pick up and point 52d is the point at which the relay will drop out. Curve 53 represents the input to the third sensitive relay 13c as determined by the third non-linear resonant circuit comprising capacitor 15c, capacitor 25c and adjustable reactor 17c at one of its settings. On this curve point 53p is the point at which sensitive relay 13c will pick up and 53d is the point at which the relay will drop out. Curve 54 represents the input to the remaining relays and their resistors as determined by the fourth non-linear resonant circuit comprising capacitor 15d, capacitor 25d and variable reactor 17d at one of its settings. On this curve point 54p is the point at which sensitive relay 26 will pick up (for a certain setting of resistor 27), point 54p' is the point at which relay 29 will pick up (for a certain setting of resistor 30), and 54d may represent the drop out point for relay 26. In each case, the proper sensitive relay is designed to pick up and drop out along the steep portion of the respective curve so that there is considerable amplification of voltage change compared to frequency change at the points of relay operation. This means that there will be little possibility of false operation due to vibration or chattering. As the excitation frequency supplied to any one relay is increased there is practically no response until a certain critical point is reached and then there is a very large increase in magnetic pull (due to rapidly rising voltage) because of the non-linear response characteristic, so that the relay will positively pull in and seal at a certain frequency (i. e., vehicle speed).

In Fig. 3, I have shown a series of characteristic curves of the output of the fourth non-linear resonant circuit according to adjustment to compensate for varying vehicle wheel diameter, curve 44 corresponding to the output desirable with 44" wheels, curve 43 corresponding to the output desirable with 43" wheels, and so on to curve 39 corresponding to the output desirable with 39" wheels. Thus, by adjustment of variable reactor 17d conveniently calibrated in wheel diameter, the response of the associated relays may always be made to correspond to the vehicle speed in miles per hour. It is well known that when the brakes are suddenly applied on a railway vehicle, such as a locomotive, the wheels develop flat spots so that they need to be reground to a true round in the shops. Over the years this cumulatively may amount to a change in wheel diameter of as much as six inches on a modern locomotive. An adjustment by means of a variable reactor such as 17d is desirable to compensate for such varying diameter of the wheels attached to the axle from which the tachometer generator is driven.

When the control circuit described is in operation, each of the non-linear resonant circuits provides a frequency selective network to produce a sharp rise in voltage at the frequency to which it is tuned and this voltage is then rectified to energize the associated sensitive relay. Selection of the proper values for the reactor and capacitor components makes it possible to shift this frequency response over a broad range so that automatic transition of the main drive motors may be made the function of any desired locomotive speed. Because the frequency selective circuits resonate the input signal, the desired sensitive relay can operate even though the tachometer generator voltage is lower than that otherwise required to operate such a relay.

It will be observed from Fig. 2, furthermore, that all the sensitive relays (except possibly the last) may have the same design since they pick up at the same voltage and drop out at the same voltage. It will also be observed that the band, in terms of frequency, between pickup and drop out of each relay may be made quite small to give very accurate and highly selective operation because of the sharp rise in voltage for a small change in input signal in each desired frequency range.

The energization or deactivation of the sensitive relays is dependent wholly upon special electrical correlation between the tachometer generator and the filter circuits. It will be observed from the curves of Fig. 2 that the resonance caused by each non-linear resonant circuits and increasing tachometer output voltage is not only non-linear but substantially non-peaked. That is, as the frequency rises the voltage will increase sharply through the band at which relay operation is intended, but there is no substantial peak in the characteristic so that further increase in frequency will not cause a voltage lower than the operating voltages of the relay coil.

While we have illustrated and described a preferred embodiment of our invention, it will be understood that numerous variations and modifications may be made, and we intend in the appended claims to cover any such variations and modifications as fall within the true spirit and scope of our invention.

What we claim as new and desire to secure by Letters Patent of the United States is:

1. A control system for electric motors used to drive a traction vehicle, said system comprising a tachometer generator arranged to produce an output signal variable in frequency according to the speed of said vehicle, and a plurality of controller circuits affecting the operation of said motors, said controller circuits each comprising at least one sensitive relay arranged to operate from said tachometer output signal with a separate non-linear resonance circuit interposed between each relay coil and a line carrying the output signal from said tachometer, each of said circuits arranged to produce a characteristic of output voltage which with respect to frequency is less than the operating point of the associated relay at all frequencies below a predetermined frequency and greater than the operating point of the associated relay at all frequencies above another and larger predetermined frequency, with the pick-up and drop-out values of said relay arranged to fall between said first-mentioned predetermined frequency value and said second-mentioned predetermined frequency value, and said characteristic having a sharply rising voltage with respect to frequency change between the points of drop-out and pick-up of said relays.

2. A control system as in claim 1 further characterized by having one of said controller circuits adapted to provide field weakening for said motors, another of said controller circuits adapted to affect transition of said motors from series to parallel operation with full field, still another of said controller circuits adapted to affect parallel operation of said motors with weakened field, and a further controller circuit adapted to energize a warning alarm, remove the power from said motors and stop said vehicle.

3. A control system as in claim 1 further characterized by having at least one of said controller circuits adapted to affect transition of said motors from series to parallel operation.

4. An electric control system for dynamoelectric machines used as motors driving a traction vehicle and having an axle-driven tachometer generator with an output signal variable in frequency according to the speed of said vehicle, said control system comprising a plurality of sensitive relays each having a non-linear resonance circuit and filter network interposed between the relay coil and the output from said tachometer generator to selectively resonate a different frequency signal for each of said relays, each of said different frequency signals being given by said network a non-linear response characteristic having a wide voltage range over a narrow frequency band adjacent the points of pick-up and drop-out of the respective relay with a lower voltage than the drop-out value at all frequencies below the frequency corresponding to said dropout value and a higher voltage than the pick-up value at all frequencies greater than the frequency corresponding to said pick-up value.

5. A control system as in claim 4 further characterized by each of said networks comprising a capacitor and an adjustable reactor connected in series relation relative to the output signal from said generator.

6. A control system as in claim 4 further characterized by a rectifier interposed between each of said networks and each of said sensitive relays coils.

7. An electric control system for a Diesel-electric locomotive having at least one main generator adapted to produce a supply of direct current power for a plurality of direct current motors adapted to drive said vehicle, said system comprising a tachometer generator adapted to produce an output signal variable in frequency according to the speed of said vehicle and comprising a plurality of controller circuits each having a sensitive relay, a full wave rectifier, and a non-linear resonance circuit and filter network, the non-linear resonance circuit and filter network for each of said control circuits having at least a series capacitor and a variable iron core reactor with the output of said network arranged to produce a non-linear characteristic of voltage with respect to frequency, each of said networks arranged with one of said rectifiers to supply a direct current potential to the coil of the associated sensitive relay, means including controllers for effecting control of said motors in response to operation of said sensitive relays, each of said sensitive relays through the characteristics of its associated non-linear resonance circuit and filter network being caused to operate at a different speed of said vehicle, and each of said networks imparting a sharply rising voltage characteristic with respect to a small change in speed of said vehicle between the points of dropout and pick-up of said relay, whereby, through correlation of the slope of the characteristic curves for the respective networks with change of speed at the time of the transposition, accurate and selective operation of said control system may be provided by parts which are essentially rugged and uneffected by vibration, shock and rough handling.

8. A control system as in claim 7 further characterized by having one of said controller circuits provide automatic motor field shunting, one of said controller circuits provide transposition of said motors from series to parallel operation and one of said controller circuits provide warning and overspeed protection.

CHARLES F. BAUERSFELD.
MARTIN ARTHUR EDWARDS.

REFERENCES CITED

The following references are of record in the file of this patent:

UNITED STATES PATENTS

| Number | Name | Date |
|---|---|---|
| 559,187 | Miller | Apr. 28, 1896 |
| 1,552,781 | Von Arco | Sept. 8, 1925 |
| 2,266,326 | Lillquist | Dec. 16, 1941 |